May 17, 1938.　　　F. J. OSUCH　　　2,117,496
COMBINED JUICE EXTRACTOR AND MIXER
Filed Aug. 30, 1935　　　4 Sheets-Sheet 1
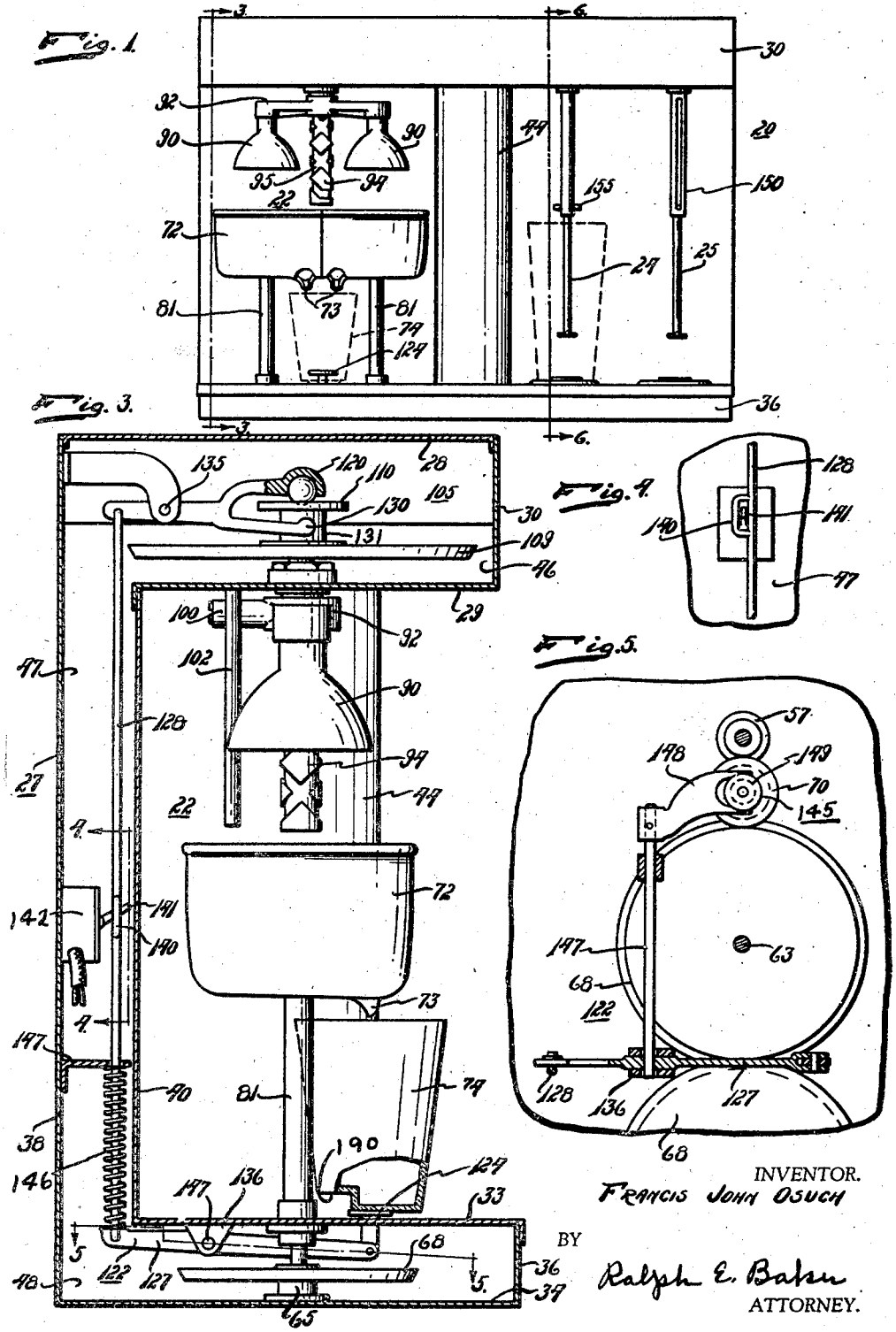
INVENTOR.
FRANCIS JOHN OSUCH
BY Ralph E. Baker
ATTORNEY.

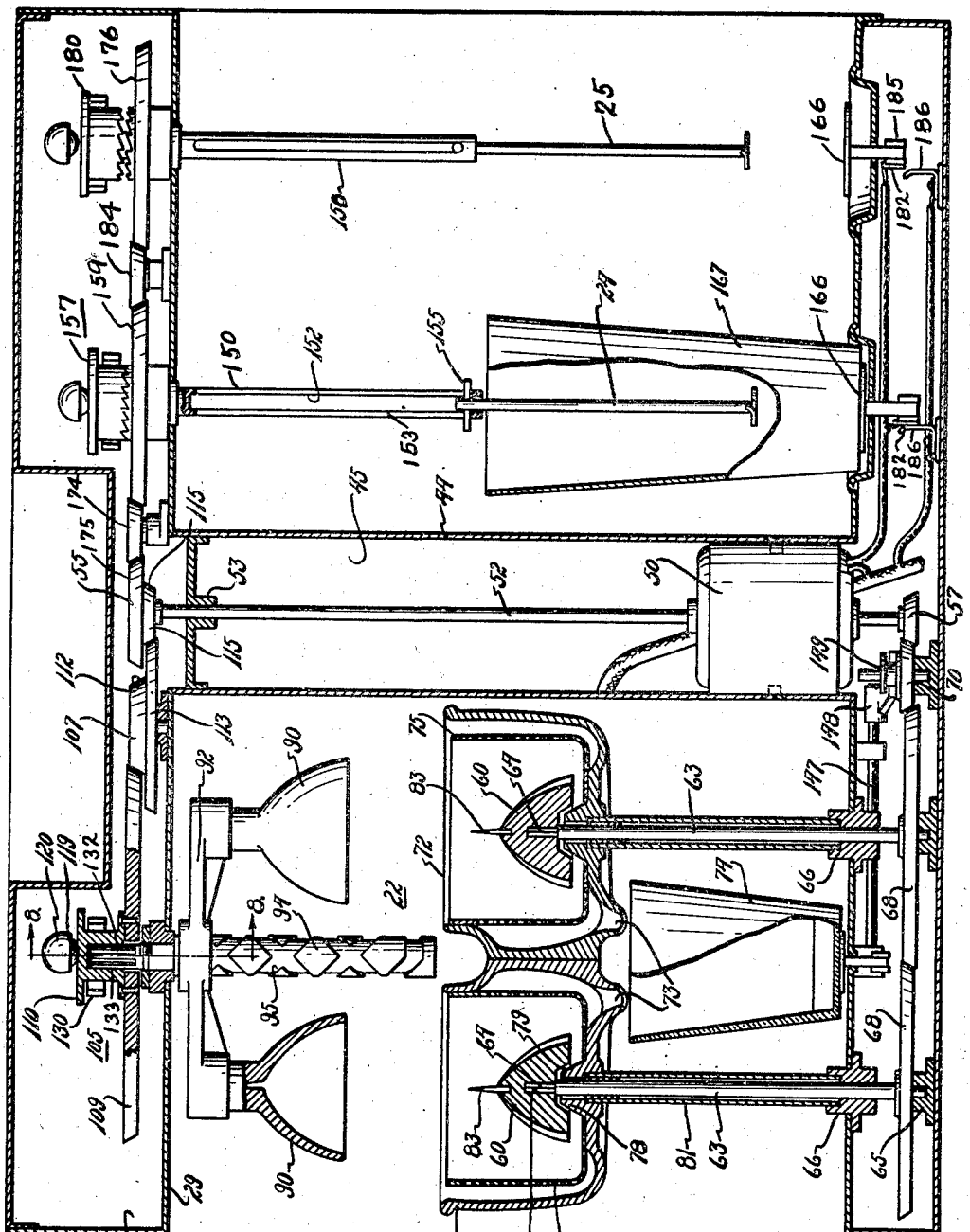

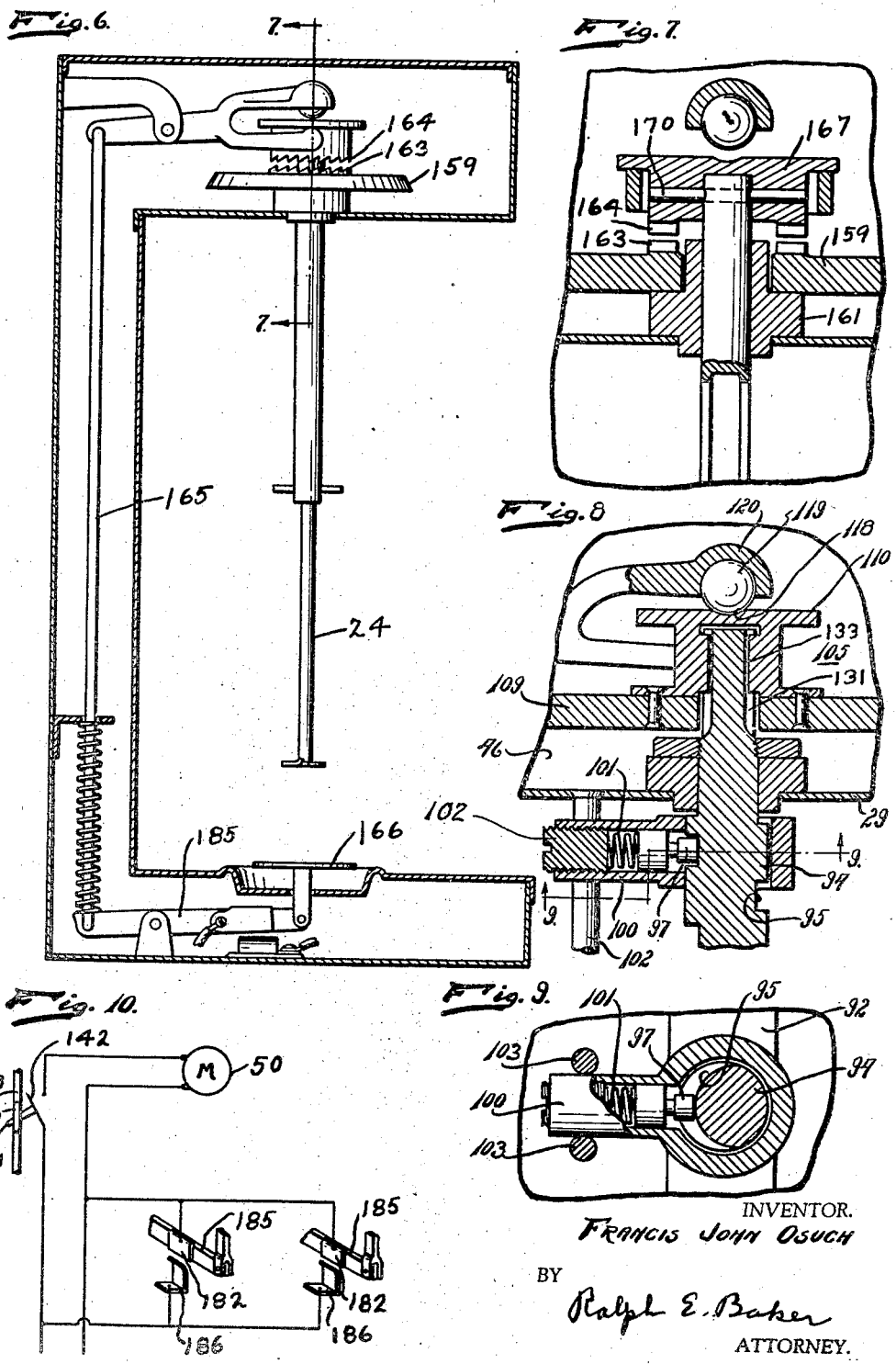

May 17, 1938.　　　　　F. J. OSUCH　　　　　2,117,496
COMBINED JUICE EXTRACTOR AND MIXER
Filed Aug. 30, 1935　　　4 Sheets-Sheet 3
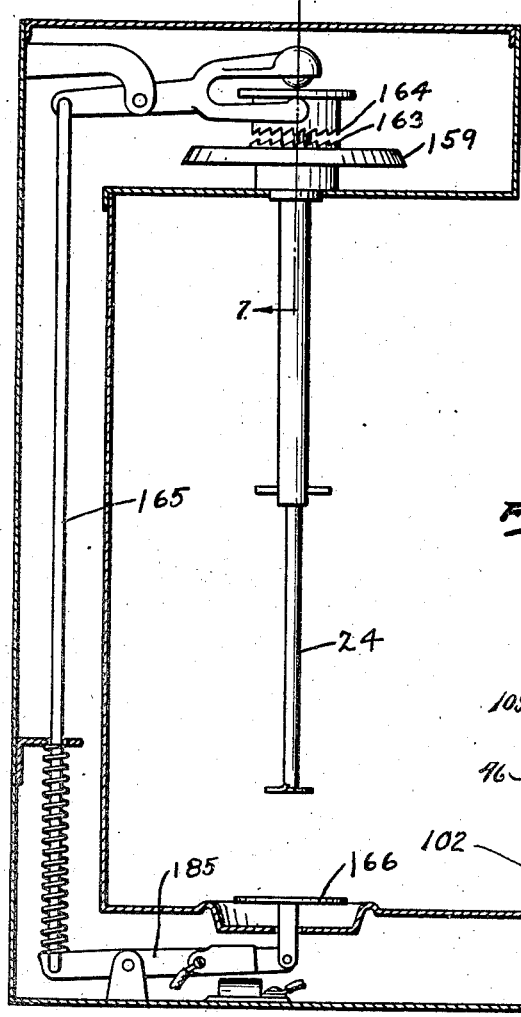
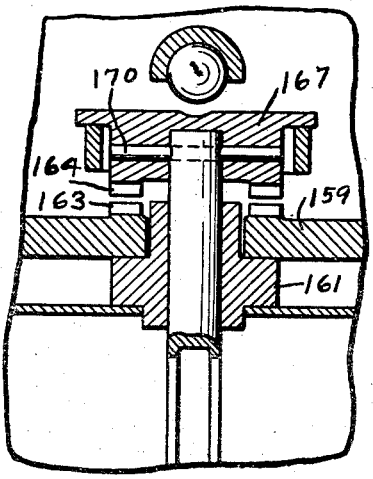
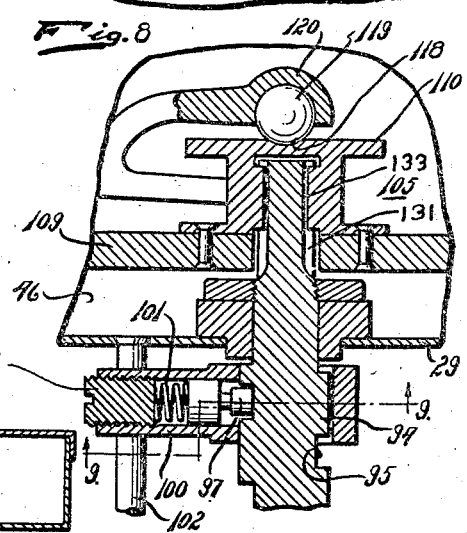
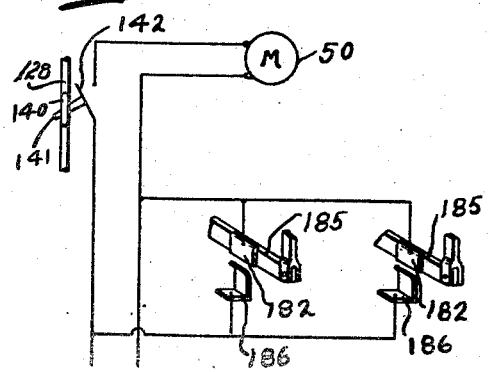
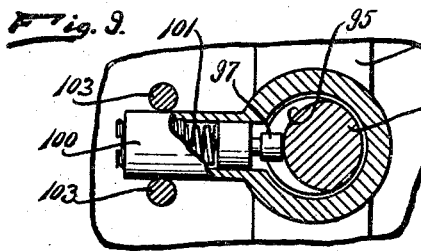
INVENTOR.
FRANCIS JOHN OSUCH
BY Ralph E. Baker
ATTORNEY.

May 17, 1938.  F. J. OSUCH  2,117,496
COMBINED JUICE EXTRACTOR AND MIXER
Filed Aug. 30, 1935   4 Sheets-Sheet 4
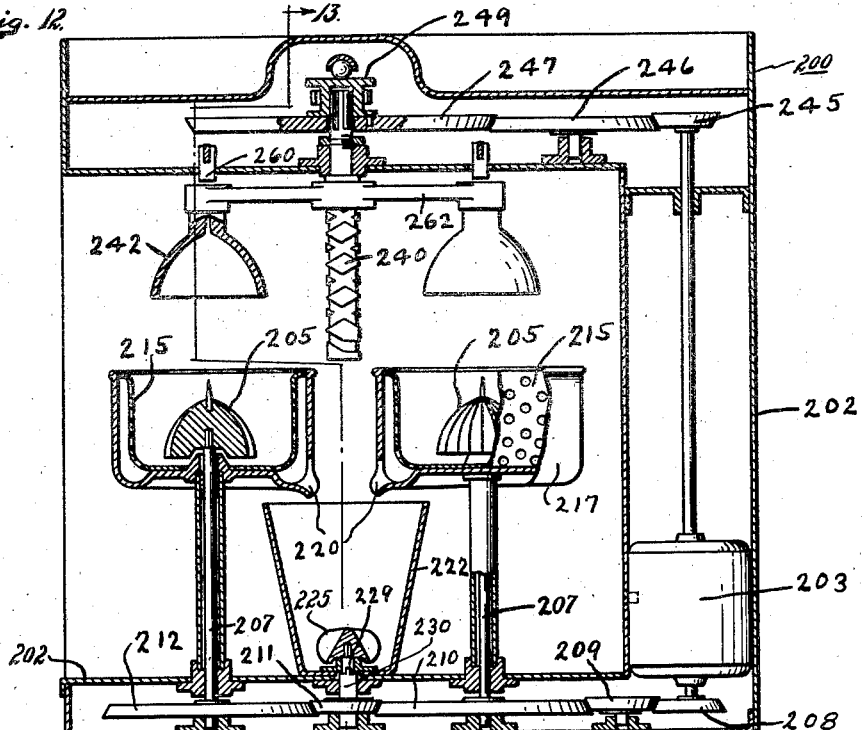
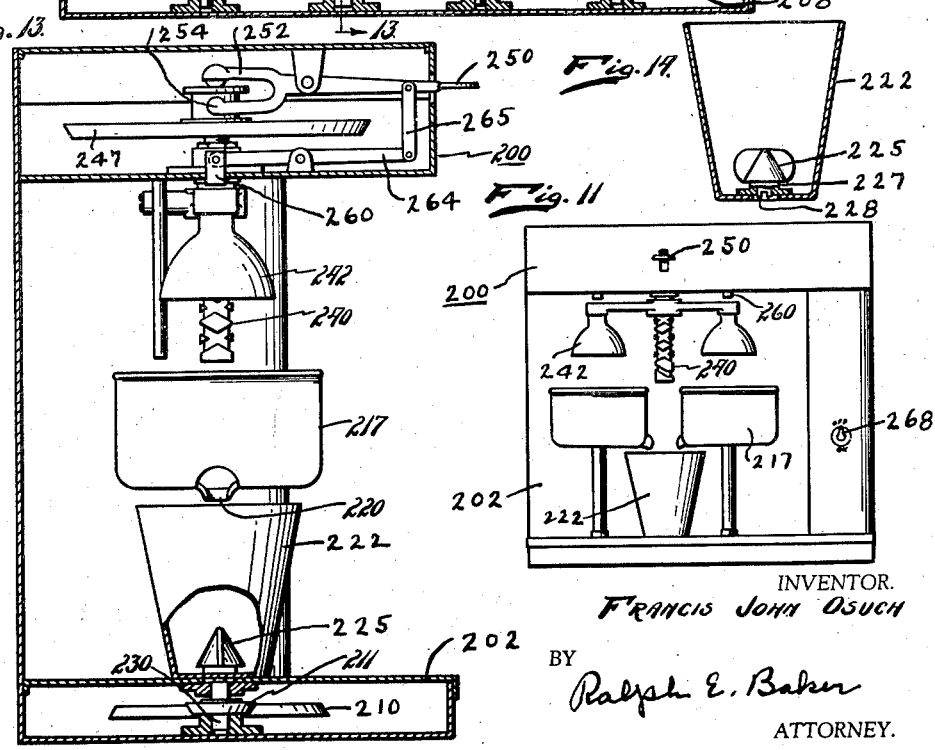
INVENTOR.
FRANCIS JOHN OSUCH
BY Ralph E. Baker
ATTORNEY.

Patented May 17, 1938

2,117,496

UNITED STATES PATENT OFFICE 2,117,496

COMBINED JUICE EXTRACTOR AND MIXER

Francis John Osuch, Detroit, Mich., assignor, by mesne assignments, to Robot Products Corporation, Detroit, Mich., a corporation of Michigan Application August 30, 1935, Serial No. 38,577

5 Claims. (Cl. 146—3)

This invention relates to a combination fruit juice extractor and liquid mixer.

One of the objects of my invention is to provide a fruit juice extracting device and a liquid mixing device so combined and associated that a single driving element may be employed for operating said devices, either independently of the other or simultaneously.

Another object of my invention is to provide an improved fruit juice extractor which is so arranged that the juice from fruit may be extracted without the necessity of the operator touching the fruit during the time the juice is being extracted therefrom.

Another object of my invention is to provide an improved fruit juice extractor which is arranged to produce large quantities of juice by having provisions for extracting the juice from one or more pieces of fruit simultaneously.

Further objects and advantages of the present invention will be apparent from the following description, reference being had to the accompanying drawings, wherein a preferred form of the present invention is clearly shown.

In the drawings:

Fig. 1 is a front view in elevation of my combined fruit juice extractor and liquid mixer embodying features of my invention;

Fig. 2 is an enlarged view in cross section of the apparatus shown in Fig. 1;

Fig. 3 is a view taken along line 3—3 of Fig. 1;
Fig. 4 is a view taken along line 4—4 of Fig. 3;
Fig. 5 is a view taken along line 5—5 of Fig. 3;
Fig. 6 is a view taken along line 6—6 of Fig. 1;
Fig. 7 is a view taken along line 7—7 of Fig. 6;
Fig. 8 is a view taken along line 8—8 of Fig. 2;
Fig. 9 is a view taken along line 9—9 of Fig. 8;
Fig. 10 is a diagrammatic view of the motor circuit;

Fig. 11 is a front view in elevation of a modified form of juice extracting apparatus embodying features of my invention;

Fig. 12 is an enlarged view of the apparatus shown in Fig. 11 and in cross section;

Fig. 13 is a view taken along line 13—13 of Fig. 12; and

Fig. 14 is a view in cross section of a mixing vessel embodying features of my invention.

In accordance with my invention, I provide a compact and unitary fruit juice extractor and liquid mixing apparatus which is operated with a single driving element, and which is so arranged that one or more elements and a juice extracting element may be operated by said driving element, either independently or simultaneously with the other elements.

Referring to the drawings, the combined juice extracting and liquid mixing apparatus is designated by the numeral 20. The apparatus 20 comprises, in general, a fruit juice extracting element or unit 22, and a plurality of liquid mixing elements 24 and 25.

The juice extracting element 22 and the mixing elements 24 and 25 are carried by a support 27. The support 27 is constructed preferably of sheet metal and includes upper spaced apart sheets 28 and 29 closed at the front edges by a flanged edge 30 of sheet 29. The support also includes lower spaced apart sheets 33 and 34 closed at their front edges by a flanged edge 36 of sheet 34. The sheet 34 is also bent to form a rear wall 38 which is joined to upper sheet 28. Sheet 33 is bent to form a vertical wall 40 which extends parallel to the rear wall 38 but spaced therefrom and is joined to sheet 29. The sheet 40 is also provided with an outwardly formed portion 44 which serves to provide a motor compartment 45. By so joining the various sheets of metal, there is provided, in addition to the motor compartment 45, an upper compartment 46, rear compartment 47 and lower compartment 48. The sheet metal member 28 is provided with an indented portion 49 which may serve to hold fruits, such as oranges, lemons, etc. The sheet metal members may be joined together by any suitable means, such as bolts (not shown), solder or welded, as desired.

Within the motor compartment 45 there is provided an electric driving motor 50 and its shaft 52. The shaft 52 is journalled in a bearing 53 which is secured to the sheet metal portion 44. On the upper end of the shaft is provided a bevelled friction wheel 55 through which power is transmitted to certain operating mechanism of the extracting element 22 and also the mixing elements 24 and 25. Upon the lower end of the shaft 52, there is provided a bevelled friction wheel 57 which is used for transmitting power to various operating parts of juice extracting elements 60.

The juice extracting elements 60 are removably mounted on rotatable shafts 63 by means of reduced ends 64 of the shafts 63, which reduced ends are preferably square in cross section and are received in square openings 65 in the extracting elements 60 to thereby permit longitudinal movement of the elements relative to the shafts 63, while at the same time preventing relative lateral movement between shafts 63 and the elements 60. The elements 60 may be of any desired configuration. The shafts 63 at their lower ends are mounted in bearings 65 which are carried by sheet metal member 34, and are also journalled in bearings 66 which are carried by sheet metal member 33. The shafts 63 are rotated by means of bevelled friction wheels 68 which are secured to the shafts 63 and which rest upon the upper surface of the bearings 65. The bevelled friction wheels are driven by means of the bevelled friction wheel 57 which is carried by the motor shaft 52 by means of an idler bevelled friction wheel 70.

The juice extracting elements 60 are surrounded by a pair of readily removable cup shaped members 72 which are provided with outlets 73 which are so positioned as to conduct the extracted juice to a single vessel 74. Within the cup shaped members 72 and surrounding the juice extracting elements are provided removable perforated cup shaped members 75 which are provided to strain the extracted parts of the fruit so as to permit only juice to be conducted through the outlets 73 into the vessel 74. Preferably, the cup shaped members 72 are provided with an upwardly directing boss 78 which extends into a recess 79 within the extracting elements 60 so as to prevent overflow of juice from the cup 72 between the boss 78 and the shaft 63. Surrounding the shafts 63 there is provided tubular guard members 81 which also serve to support the cup shaped members 72 in position. The guards 81 extend from the bosses 78 of cups 72 to the bearings 66 mounted on sheet metal member 33. By so providing two juice extracting elements, for example, it is possible to slice an orange in half and to place one-half of the orange over one of the extracting elements 60 and one-half over the other element 60, and thus extract juice from the entire orange at one time. Also, if desired, an orange half may be placed over one of said elements and a half lemon over the other element and by operating the two simultaneously a mixture of lemon and orange juice may be obtained. In order to prevent the fruit from sliding about on the upper surface of the extracting elements 60, I have provided sharp pointers 83 for piercing the fruit as it is moved towards the elements 60.

The orange juice extracting element 22 includes also a pair of cup shaped squeezers or pressers 90, which are arranged to be moved by operation of the motor 50, for pressing the fruits against the extracting elements 60 during periods when the juice is being extracted from the fruits. The pressers 90 are carried by a horizontally disposed support 92 which is arranged to move up and down a rotatable shaft 94 so as to provide reciprocatory movement of the cups 90 to and from the extracting elements 60. The shaft 94 is provided with double spiral flutes, grooves or recesses 95. The horizontal support 92 is provided with a spring pressed plunger 97, which is arranged to slide within the double spiral grooves 95 so that upon rotation of the shaft 94 the plunger 97 will be guided by the spiral grooves up and down the shaft 94 in the well known manner, to thereby move the support 92 up and down the shaft 94. The plunger 97 is enclosed within a hollow abutment 100. Within the abutment 100 there is provided a spring 101 which is arranged to exert its pressure upon the plunger 97 on one end and an abutment plug 102 on the other end. In order to prevent lateral movement of the support 92, there is provided pins 103 which are secured to the sheet metal member 29 and on opposite sides of the abutment 100.

The operation of the shaft 94 of the juice extracting unit 22 is controlled by means of a clutch 105 and a bevelled idler wheel 107 which is arranged to transmit power from the bevelled wheel 55 to the clutch element 105. The clutch element 105 comprises bevelled wheel 109, which is secured to the upper end of the shaft 94 by means of a bearing support 110. The bevelled wheel 109 of clutch element 105 is arranged to be moved into and out of engagement with a bevelled surface 112 of the bevelled wheel 107. The bevelled wheel 107 is also provided with a bevelled surface 113 which is always in engagement with a bevelled surface 115 of the wheel 55. The bearing support 110 is provided with a small concave surface 118, which is arranged for receiving and supporting a spherically shaped bearing 119. The bearing 119 is held in contact with the bearing support 110 by an operating arm 120 which carries bearing 119. The operating arm 120 is moved by suitable leverage mechanism 122. The leverage mechanism 122 is arranged to be actuated by means of a support button 124 for the vessel 74. The leverage mechanism 122 includes the arm 120, support button 124, lever 127 and rod 128. To the rod 128 is integrally united a pair of fingers 130, which extend on opposite sides of a reduced portion 131 of the bearing support 110 and are arranged to move the bearing support 110 and bearing wheel 109 upwardly and downwardly on the grooved end 132 of shaft 94, to engage and disengage the bevelled surface 112 of wheel 107. The end 132 is received in a grooved aperture 133 in the bearing support by a sliding fit which permits longitudinal movement of the support 110 and the shaft end 131, but prevents lateral movement therebetween. The operating arm 120 is pivoted as at 135 and the lever 127 is pivoted as at 136. Thus, it will be noted that when the vessel 74 is placed on the support 124 of leverage mechanism 122, the leverage mechanism will move the clutch mechanism 105, including the bevelled wheel 109 in engagement with the bevelled wheel 107, to thus rotate the shaft 94 by means of motor 50. In order to control the operation of the motor 50, the rod 128 is provided with a connection 140 which is associated with an off-on switch lever 141 of switch 142 for starting and stopping the motor. The switch 142 is so arranged that a downward movement of button 124 closes the switch to complete the electric circuit to the motor 50. Thus, a downward movement of support 124 for vessel 74, by the vessel itself, will not only start the motor but also actuate the clutch 105 to cause operation of shaft 94 to effect the reciprocatory movement of pressers 90. At the same time that the clutch mechanism 105 conditions the shaft 94 for rotation and initiates the operation of motor 50, a second clutch member 145 moves the bevelled wheel 70 into engagement with one of the bevelled wheels 68 and the bevelled wheel 57. This causes the juice extracting elements 60 to begin rotation simultaneously with the rotation of the shaft 94 and the starting of the motor 50. The clutch element 145 includes a rod 147, which forms the pivot point 136 for the lever 127 and is rigidly secured to lever 127. The rod 147 has rigidly secured thereto an operating arm 148 which surrounds a reduced portion 149 of clutch 145 which is secured to the wheel 70. By this arrangement, the leverage mechanism 122 simultaneously operates clutch members 105 and 145 and an electric switch for starting and stopping the motor 50. When the vessel 74 is removed from the support button 124, the leverage mechanism 122 moves automatically to actuate clutches 105 and 145 and switch lever 141 to interrupt operation of shaft 94, elements 60 and motor 50. This movement is accomplished by means of spring 146 which surrounds rod 128 and exerts its pressure against a bracket 147 which is rigidly secured to sheet metal member 38.

The mixing element 24 is carried by hollow shaft 150 which shaft is provided with bore 152 and slots 153. By this arrangement, the mixing element 24 may slide longitudinally within the bore 152 and by means of a transversely extending pin 155 in element 24, the mixing element 24 is prevented from lateral movement relative to the shaft 150, but is so arranged that the mixing elements 24 may be moved longitudinally with respect to the shaft 150 to facilitate the insertion of a vessel thereabout. Rotation of the shaft 150 is controlled by means of a clutch element 157. The clutch element 157 is operated by suitable leverage mechanism 165 which corresponds to the leverage mechanism 122 and includes a supporting button 166 for receiving a mixing vessel 167. By downward movement of the support button 166, the clutch mechanism conditions the apparatus so that the shaft 150 may be rotated to effect mixing within the vessel 167. The clutch element 157 includes a bevelled friction wheel 159 which is arranged to rotate on a bearing 161 which bearing also journals the shaft 150. The upper surface of wheel 159 is provided with a plurality of teeth 163 which cooperate with teeth 164 carried by clutch member 166 when the teeth 164 are moved into engagement with teeth 163. The shaft 150 is rigidly secured to member 166 by a pin 170 and until the clutch is moved by button 166, the wheel 159 rotates merely as an idler wheel. When the clutch teeth are moved into engagement, the wheel 159 serves to effect rotation of shaft 150. The wheel 159 is driven by power received from the motor 50 by means of a bevelled friction wheel 174 which is in engagement with bevelled surface 175 of wheel 55. A bevelled wheel 176 provides operation of the mixing device 25 in the same manner as the bevelled wheel 159 controls operation of the mixing device 24, that is, by means of clutch mechanism 180, which is the same as clutch mechanism 157. The clutch 180 is operated by leverage mechanism the same as mechanism 165. The wheel 176 is rotated by an idler wheel 184 which is in engagement with wheel 159.

In order to control the operation of the motor 50, when it is desired to employ one of the mixing devices 24 or 25, I have provided a switch contact 182 which is carried by each lever 185 of each leverage mechanism 165 so that the contact moves into and out of engagement with a stationary contact 186 upon movement of lever 185. Thus, a movement of the supporting buttons 166 causes the clutches 157 and 180 to cause rotation of the shafts 150 and to start operation of the electric motor 50. This may be accomplished by movement of only one or both of the supporting buttons 166, because each set of contacts 182-186 is connected in parallel in the motor circuit. Preferably, the contacts 182 are insulated from lever 185 by insulating material (not shown).

Preferably, vessel 74 is recessed as at 190 so that the vessel can be moved off the supporting button 124 to permit the button 124 to move upwardly in the recess 190 so as to discontinue operation of the motor 50, extractors 60 and pressers 90. With this arrangement, the vessel 74 can remain under outlets 73 of cups 72 to receive the balance of extracted juice from said cups after the device has ceased operation. The upward movement of the button 124 is caused by spring 146 which moves leverage mechanism 122 to disengage clutches 105 and 145 and to open the electric circuit through switch 142.

As hereinbefore stated, the cups 72, perforated cups 75 and extractor 60 have been made readily removable. This permits the ready removal of these parts for the cleaning of same. The cups 72 are movably disposed upon the upper ends of guard 81 and are preferably arranged so that they may be rotated laterally and slid longitudinally upon said guards. By this arrangement, cups 72 may be rotated laterally so that the two outlets 73 are moved away from each other so that the side walls of cups 72 are in such a position that the same clear the lower end of the shaft 94, thus, permitting upward movement of cups 72 from the shafts 63. The extracting elements 60 may be moved upwardly at any time so as to remove same for cleaning. When the elements 60 are removed, the perforated cups 75 may then be removed and thereafter the cups 72 may be readily removed.

Although I have shown a plurality of bevelled friction wheels for transmitting power from the motor 50 to juice extractor 22 and the mixers 24 and 25, it is to be understood that other driving and driven elements may be substituted therefor as desired.

From the foregoing, it will be noted that I have provided a combined fruit juice extracting element and a liquid mixing apparatus which is so combined and arranged that the extracting element or the mixing element may be operated independently of each other, or the same may be operated simultaneously, and that the operation of these elements is controlled by merely placing a vessel upon a supporting button which automatically initiates operation of the driving motor and controls engagement and disengagement of certain clutch mechanism, which thus permits either independent operation of the various devices or simultaneous operation of the various devices although a single motor is utilized.

It will also be noted, in view of the foregoing, that the entire apparatus is one which is economical to operate and one which is manufactured from stampings and other inexpensive parts to produce a small compact device which will not only produce large quantities of juice from fruits, by extracting the juice from more than one piece of fruit at a time, but also has provisions for mixing various liquids at the same time.

Referring now to Figs. 11 to 14, inclusive, I have shown a modified form of juice extracting element designated, in general, by the numeral 200. The apparatus 200 comprises, in general, a sheet metal support 202, which is constructed substantially the same as sheet metal support 27, with that part of the support employed for supporting a mixing apparatus being omitted. The apparatus 200 also includes a driving motor 203, which is employed for driving the juice extracting elements 205 by means of shafts 207 through the medium of bevelled wheels 208, 209, 210, 211 and 212. The extracting elements 205 are the same as elements 60 and are disposed within readily removable perforated cups 215, which are disposed within cups 217. The cups 215 and 217 are the same as cups 75 and 72, respectively. The extractors 205, cups 215 and 217 are arranged to be readily removable in the same manner as is extractor 60, cups 72 and 75. In this embodiment of my invention, the cups 217 are spaced slightly from each other and are provided with outlets 220 for conducting the extracted juice into a vessel 222. Within the lower part of vessel 222 there is provided a mixing element 225 having a shaft portion 227 provided with a slot 228 which cooperates with a tongue 229 of shaft 230. The shaft 230 is rotated by bevelled wheel 211. By this arrangement, vessel 222 and mixing element 225 may be readily removable from shaft 230 and readily returned to position where shaft 230 engages shaft 227 to rotate mixer 225.

The element 200 also includes a rotatable shaft 240, which corresponds in all respects to shaft 94. The shaft 240 is employed to effect reciprocatory movement of pressers 242 in the same manner as shaft 94 effects reciprocatory movement of pressers 90. Rotation of shaft 240 is effected by means of bevelled wheels 245, 246 and 247. The bevelled wheel 247 forms part of a clutch mechanism 249, which corresponds in all respects to clutch mechanism 105. In order to control the operation of the clutch mechanism so that same will permit power to be transmitted from the motor 203 to bevelled wheels 245, 246 and 247, a hand lever 250 is provided. The hand lever 250 is integrally connected with operating arm 252 and operating fingers 254, which control the clutch mechanism in the same manner as clutch 105 is controlled. By this arrangement, an upward movement of lever 250 will cause a downward movement of wheel 247 to engage wheel 246 and a downward movement of lever 247 will disengage said wheel to discontinue operation of shaft 240. In addition to this leverage mechanism, I have also provided a pair of studs 260 which are provided to act as releases for automatically disengaging wheel 247 from wheel 246 upon an upward movement of pressers 242 upon shaft 240. As will be noted, pressers 242 are carried by a horizontal support which I have designated 262. When the support 262 moves upwardly upon shaft 240, said support will engage releases 260 and upon an upward movement of releases 260, said releases, through levers 264 and 265, will effect a downward movement of lever 250 to automatically discontinue operation of the shaft 240. Thus, the lever 250 may be used when it is desired to manually initiate operation of shaft 240 to start said pressers 242 into motion so that same move downwardly on shaft 240 to engage the fruit being extracted, and when the juice is extracted from the fruit, the pressers 242 move upward to automatically discontinue operation of shaft 240 until again manually conditioned for operation. In order to control the starting of the electrical motor, I have provided a conventional type of an off-on switch 268. Thus, the motor may continue to rotate the extracting elements 205 after the pressers have discontinued operation and until all of the juice is extracted from the fruits and said juice has been conducted into mixing vessel 222.

Although only a preferred form of the invention has been illustrated, and that form described in detail, it will be apparent to those skilled in the art that various modifications may be made therein without departing from the spirit of the invention or from the scope of the appended claims.

I claim:

1. In a device of the character described, a support, a motor carried by said support, a plurality of rotatable juice extracting elements, shaft means for rotating said juice extracting elements, a plurality of squeezers adapted to cooperate with said juice extracting elements, means for controlling the movement of said squeezers within certain limits to and from said juice extracting elements, and clutch means positioned in the path or movement of one of said squeezers and operable by the engagement of one of said squeezers therewith upon the movement of said squeezers away from said juice extracting elements for interrupting the operation of said squeezers, even though the juice extracting elements continue to operate.

2. In a device of the character described, a motor, a rotating shaft operatively associated with said motor, a juice extractor removably connected with said shaft, a readily removable cup surrounding said extractor, a readily removable perforated cup positioned within said first named cup and surrounding said extractor, a fruit squeezer, and operating mechanism associated with said squeezer and motor adapted to move said squeezer under the influence of said motor toward said extractor as the extractor removes the juice from the fruit, said squeezer and its operating mechanism being so constructed and arranged to move toward and then away from the extractor and clutch means engageable by said squeezers to discontinue operation of said squeezers until again conditioned for operation.

3. In a device of the character described, a support including hollow top, rear and bottom sections, a pair of juice extracting elements positioned between the top and bottom sections, a pair of squeezing elements positioned between said sections, operating means within the hollow top section for operating said squeezing elements, operating means within the hollow bottom section for operating said extracting elements, shaft means extending from within said top section to said squeezing elements for effecting reciprocating movement to said squeezing elements, shaft means extending from within said hollow bottom section to said extracting elements for causing rotary movements of said extracting elements, clutch means in said top hollow section for controlling operation of said squeezing elements, leverage mechanism rigidly but pivotally connected in said top, rear and bottom section, additional leverage mechanism associated with the first leverage mechanism and extending from the leverage mechanism in the bottom section upwardly toward said extracting elements, a support for a vessel carried by said additional leverage mechanism, said leverage mechanism being operatively connected to said clutch so that upon the placing of said vessel upon said support the clutch will condition the squeezing elements for operation and a spring for disengaging said clutch upon removal of said vessel.

4. In a device of the character described, a squeezing element, a juice extracting element, clutch means for controlling the operation of said squeezing element, leverage mechanism operatively connected with said clutch means for controlling said clutch means, a spring normally disengaging said clutch means, a vessel for receiving extracted juice, a platform for receiving said vessel, and means connecting said platform to said leverage mechanism, said leverage mechanism and spring being so balanced and arranged that the weight of said vessel when placed upon said platform is sufficient to actuate the leverage mechanism and cause engagement of said clutch means.

5. In a device of the character described, squeezing elements, juice extracting elements, clutch means for controlling the operation of said squeezing elements, leverage mechanism operatively connected with said clutch means for controlling said clutch means, a spring normally disengaging said clutch means, a vessel for receiving extracted juice, a platform for receiving said vessel, means connecting said platform to said leverage mechanism, said leverage mechanism and spring being so balanced and arranged that the weight of said vessel when placed upon said platform is sufficient to actuate the leverage mechanism and cause engagement of said clutch means, and a control element operatively connected to said leverage mechanism to simultaneously effect operation of said squeezing elements with the extracting elements solely by the placing of the vessel upon said platform.

FRANCIS JOHN OSUCH.